July 7, 1936.   C. E. DATH   2,046,322
COUPLING HITCHING LINK
Filed Aug. 17, 1935
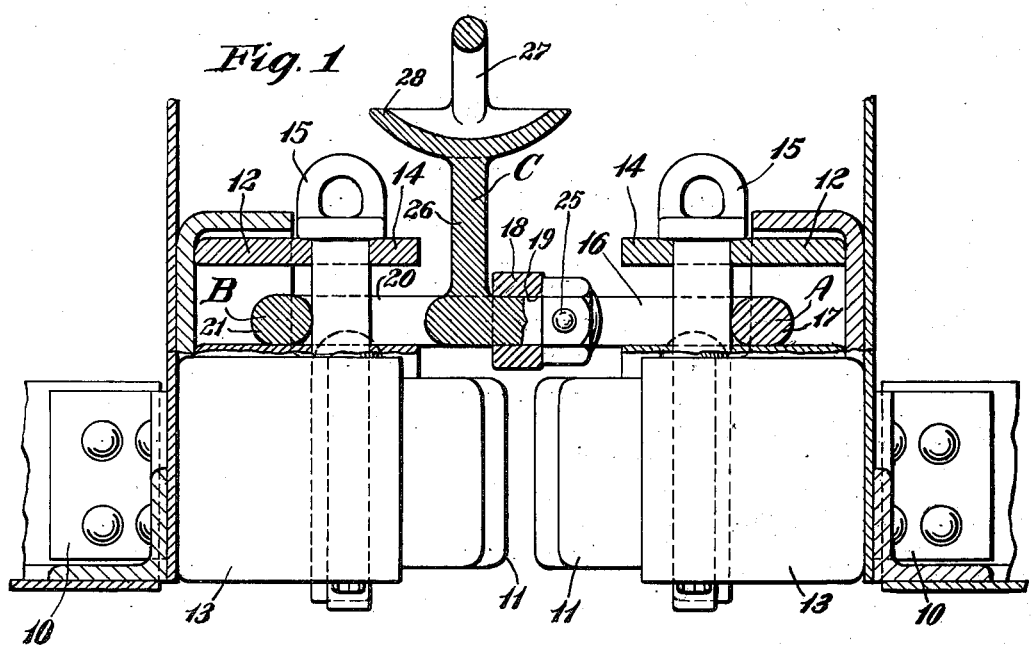
Inventor
Charles E. Dath
By Henry Fuchs
Atty.

UNITED STATES PATENT OFFICE 2,046,322

COUPLING HITCHING LINK

Charles E. Dath, Chicago, Ill., assignor to W. H. Miner, Inc., Chicago, Ill., a corporation of Delaware Application August 17, 1935, Serial No. 36,695

14 Claims. (Cl. 213—210)

This invention relates to improvements in hitching links especially adapted for mine cars.

One object of the invention is to provide a safety hitching link coupling means for cars which effectively prevents injury to the attendant while coupling said cars.

A more specific object of the invention is to provide a coupling connection for mine cars, comprising a link having a hand grip for manipulating the same, wherein the operator is effectively protected against injury by means of a guard or shield so placed with respect to the link and coupling heads of the cars that it is impossible for the operator's hand to be accidentally caught between the coupling members when the cars are brought together in the coupling operation.

Other objects of the invention will more clearly appear from the description and claims hereinafter following.

In the drawing forming a part of this specification, Figure 1 is a vertical, sectional view through the end portions of two mine cars, showing the combined draft and buffing devices thereof partly in section and partly in elevation, and illustrating my improved safety coupling link means in connection therewith, said means being shown in section corresponding to the line 1—1 of Figure 2. Figure 2 is a top plan view showing the safety coupling link means detached from the cars. Figure 3 is an end elevational view, looking in the direction of the arrows 3—3 in Figure 2.

In said drawings 10—10 indicate the end portions of two cars having the usual combined draft and buffing means mounted thereon. The draft and buffing means of each car, which is of well-known design, comprising a buffing head 11, a draft member 12, and spring or other shock absorbing means, not shown, which yieldingly opposes inward movement of the buffing head and outward movement of the draft member. The combined draft and buffing means is mounted in the usual housing 13 fixed to the end of the car, and the draft member 12 is provided with a coupling head 14 in the form of a forked member, between the arms of which the coupling link is adapted to be accommodated. As will be understood, coupling pins 15—15, which extend through openings in the arms of the coupling heads 14—14, are employed to anchor the connecting links to the draft members 12—12.

My improved safety hitching link means comprises broadly a pair of links A and B, which are swiveled together for relative rotation about their longitudinal axes, and a shielded hand grip C provided on one of said links.

The link A is in the form of a loop having side arms 16—16 connected at one end by a curved section 17 and connected at the other end by a straight section 18. The straight section 18 is thickened at the center and has an opening 19 therethrough adapted to accommodate an extension of the link B, hereinafter more fully described.

The link B is also loop-shape, having side arms 20—20 connected by curved end sections 21 and 22. The section 22 is provided with an extension 23 in the form of a cylindrical stem which extends through, and is journaled in, the opening 19 of the link A. The two links are held together by a nut 24 threaded on the outer end of the extension or stem 23 and bearing on the inner side of the straight section 18 of the link A. The nut 24 is preferably locked by a pin 25 extending through the nut and the stem 23.

The hand grip C, which is preferably formed integral with the curved end section 22 of the link B, comprises a shank member 26 which projects at right angles from the link B, a loop or stirrup-shaped hand grip 27 at the outer end of the shank, and a cuplike or disk-shaped dished guard or shield 28 between the hand grip and the shank proper. The loop member 27 is preferably formed integral with the shield or guard, the side arms of said loop merging with the peripheral portion of the disklike shield. As will be seen upon reference to Figures 1 and 3, the shank 26 is of such a length that the hand grip 27 and the shield 28 are located quite a distance above the coupling heads 14—14 of the draft members 12—12 when the cars are coupled. The spacing of the shield 28 from the top of the link B by the connection of the shank therewith is such that the upper portion of the shield will be located appreciably above the coupling heads when the coupling connection formed by the links A and B is hanging down or drooping in its extreme position when connected to one car only, whereby it is impossible for the attendant to accidentally place his hand between the coupling heads while raising the link means to operative coupling position by means of the hand grip 27. The dished or cuplike form of the guard or shield 28 presents a curved lower face on the guard which may have camming engagement with the coupler heads when they are brought together to cause said shield or guard to ride upwardly and prevent binding of the same between the coupling heads.

A further advantage of the dished form of the guard disk is that the hollowed portion thereof gives clearance to accommodate the hand of the attendant while gripping the part 27, thus making it possible to employ a relatively short shank member on said grip without any risk to the attendant.

I have herein shown and described what I now consider the preferred manner of carrying out my invention, but the same is merely illustrative and I contemplate all changes and modifications that come within the scope of the claims appended hereto.

I claim:

1. A coupling member for cars, comprising a coupling link, a stem projecting from said link, a hand grip member at the outer end of said stem, and a shield on said stem immediately adjacent to said hand grip.

2. A coupling link means for cars, comprising a link member, an arm projecting from said link member, a hand grip at the outer end of said arm, and a shield member on said arm inwardly of said hand grip and spaced from said link.

3. A coupling link means for cars, comprising a link member, an arm extending from said link member, said arm having a shield adjacent to the outer end thereof, and a hand grip on said arm outwardly beyond the shield.

4. A coupling link means for cars, comprising a link member, a hand grip for said link, an arm projecting from said link and connecting the hand grip thereto, and a shield between said arm and link.

5. A coupling link means for cars, comprising a link member having a hand grip arm projecting therefrom for manipulating the same, said hand grip arm comprising a shank portion extending from said link, a shield on the outer end portion of said shank, and a hand grip member outwardly beyond said shield.

6. A coupling link means for cars, comprising a link member having a manipulating arm extending therefrom, said arm including a shank, a hand grip at the outer end of said shank, and a disklike shield inwardly of said hand grip and closely adjacent thereto.

7. A coupling link means for cars, comprising a link member having a manipulating arm extending therefrom, said arm including a shank, a hand grip at the outer end of said shank, and a dished, disklike shield inwardly of said hand grip at the outer end of said shank.

8. A coupling link means for cars, comprising a link member having a manipulating arm extending therefrom, said arm including a shank, a hand grip at the outer end of said shank, and an inwardly dished disklike shield adjacent to said hand grip between said grip and shank.

9. A coupling link means for cars, comprising a link member having a manipulating arm extending at right angles therefrom, said arm including a shank, a hand grip at the outer end of said shank, and a dislike shield inwardly of said hand grip, spaced from said link and having the side thereof remote from said hand grip rounded.

10. A coupling link means for cars, comprising a link member having a manipulating arm extending therefrom at right angles, said arm including a shank, a hand grip at the outer end of said shank, and a platelike shield between said hand grip and shank, said shield being hollowed out at the side thereof adjacent to said hand grip.

11. A coupling link means, comprising a link member, an arm extending from said link member, a platelike shield at the outer end of said arm, and a looplike hand grip connected to said shield.

12. A coupling link means for cars, comprising a link member having a manipulating arm extending therefrom, said arm including a shank, a stirruplike hand grip at the outer end of said shank, and a cup-shaped shield inwardly of said hand grip and closely adjacent thereto.

13. A coupling link means, comprising a pair of links connected at the ends for swiveling movement about their longitudinal axes, an upstanding stem formed integral with one of said links and projecting at right angles therefrom, a hand grip at the outer end of said stem, and a shield member between said stem and hand grip.

14. In a coupling means for connecting cars having forked coupling heads, the combination with a pair of links connected at the ends for relative swiveling movement about their longitudinal axes; of coupling pins for connecting said links to said heads; an upstanding arm at one end of one of said links; a hand grip at the outer end of said arm; and a disklike shield on said shank spaced from said link and disposed inwardly of said hand grip, the spacing between said link and shield being not less than the spacing between the top of the coupling head and the link at said stem when said link is in its extreme drooping position while connected to one of said heads only.

CHARLES E. DATH.